Patented Jan. 29, 1952

2,583,697

UNITED STATES PATENT OFFICE 2,583,697

PROCESS OF COMMINUTING FOOD PRODUCTS

John L. Hendry, Jr., and Richard R. Pederson, Elizabeth, N. J.

No Drawing. Application June 5, 1950, Serial No. 166,296

7 Claims. (Cl. 99—140)

Our present invention relates to the fine comminuting and preserving of such materials as cocoanut meat, cocoa beans and vanilla beans and parts thereof, ginger root and dry spices, which materials are all edible and constitute flavoring material (seasoning material), the very fine grinding of which, by ordinary methods, produces considerable difficulties and also is liable to produce products which are defective on account of possible oxidation of some of the essential oils or other flavoring material present, and some of these materials also contain large amounts of glyceride fats which are prone to undergo oxidation and rancidification during grinding in an atmosphere of ordinary air, thereby deteriorating the products. Oils or fats are present in large amounts in cocoanut meat, cocoa beans and vanilla beans in particular, some of these oils or fats are known to have a strong tendency towards rancidification. Heretofore it has not been readily possible to reduce cocoanut meat to a very fine pulverulent condition, in which the major part of the particles have a size of substantially below 30 microns, on account of oxidation, etc. taking place, and on account of the high fatty content, and the character of the cocoanut oil, cannot be ground in an ordinary grinding mill to a fine pulverulent condition. When attempting to grind in the ordinary way, the grinding always produces more or less friction, which develops heat.

In speaking of spices, we refer particularly to such as cloves, allspice, pepper, etc., which are dry brittle materials of a relatively tough nature containing much cellulose. The same is true of bark spaces such as cinnamon. The aromatic principles in such spices are in many cases highly complex organic compounds which are subject to deterioration in ordinary grinding mills in which air is present in the grinding or cutting compartment, in contact with the spice undergoing grinding. And of course a large amount of frictional heat is usually developed.

In accordance with the present invention, we first chill the material to be comminuted, or reduced to a very fine condition, by treatment with liquefied nitrogen which, as well known, reduces the temperature of such materials down to far below zero Fahrenheit, and in our process we preferably so regulate the speed of materials to be comminuted and liquid nitrogen, as to reduce the temperature of the material under treatment down to below —100° F. and preferably to near —200° F., say —175 to —225° F.

This reduction of the temperature of the material ordinarily will not require more than half a minute or so, while the material under treatment is within the enclosure of the mill and during this period practically all of the air (which includes free oxygen) initially contained in the raw material, has been driven out or eliminated.

The reduction of the temperature of the materials down to the low temperatures here indicated, renders the said materials extremely brittle so that the hammer of the mill striking these particles, reduces them down to an extremely small particle size such as below 30 microns and preferably below 20 microns.

Preferably the material (e. g. fine pulverized cocoanut meat, with the normal oil content) is packaged directly as it comes from the mill, in an extremely cold condition and in an atmosphere which consists essentially of pure nitrogen. In this condition the material is proof against becoming rancid and the essential oils and fatty oils and flavoring materials therein are thereby preserved from oxidation.

The meat of the cocoanut, as is well known, contains a considerable amount of moisture and of the dry matter, practically 50% or even 55% is "cocoanut oil." This fat (on account of its chemical composition) is somewhat subject to oxidation, and the essential oils present therein, which impart a pleasant odor to the material are also subject to oxidation, these oxidation tendencies being considerably enhanced when the material is heated. It would be practically impossible to grind cocoanut, by the ordinary methods, down to the fine pulverulent condition in which we desire to put the same, it being understood that ordinary grinding produces considerable heat in the material, thereby enhancing the tendency of the fatty oil and essential oils present, to rancidity. In this connection it is noted that the cocoanut oil, which is a large component of the cocoanut meat, is a relatively soft fat. During ordinary grinding in a mill (without refrigeration) considerable heat is produced by the friction. This would liquefy the oil from the dry content of the cocoanut meat, causing separation, thus making it practically impossible to pulverize such material. Also since the oil, in the cocoanut meat contains a substantial amount of volatile material (the flavoring ingredient) this latter would be largely volatilized and lost or oxidized.

Further, since the cocoanut oil melts at a comparatively low temperature (e. g. 69 to 77° F.), the mechanical pressure of the grinding, together with the frictional heat, would convert the cocoanut meal into a gummy oleaginous mass of such consistency that no fine grinding of the solid matter thereof could be accomplished.

It will be understood that any moisture in the cocoanut meat as fed to the mill will at once be frozen by the intense cold, and this will accordingly not be evaporated during our process.

In our process the cocoanut meat is cut up (after being removed from the outer shell of the cocoanut and after mechanically removing the hard tough brown skin which remains on the cocoanut meat when broken from the shell).

The cocoanut meat is then shredded, or desiccated or "rice cut" by machinery already well known in the art. Any of these forms can be used in our process. The cocoanut also may have sugar or a small amount of salt added, or a small amount of propylene glycol which is used as a preservative and extender for flavoring, etc.

In this connection the cocoanut is fed into a hammer mill, being fed in through a hopper or tower, in controlled amounts, and with this is sprayed in a suitable amount of liquefied nitrogen, under controlled pressure of about 5 to 12 lbs. For ordinary practice we have found that the most efficient operating temperature for the fine comminution of the cocoanut is well below $-100°$ F. and preferably between $-175°$ F. and $-225°$ F., or roughly stated "about $-200°$ F." These temperatures are approximate and are subject to more or less variation. Before reaching the hammers of the hammer mill, contact of the liquefied nitrogen and cocoanut fed in may continue for half a minute or longer, the operation of which is to chill the cocoanut to the temperatures above indicated, and drive out entrapped and absorbed air in the cocoanut material fed in.

The hammers of the mill strike the pieces of cocoanut while the latter are at $-200°$ F. (i. e. preferably $-175°$ to $-225°$ F.).

The mills preferably used in this process are hammer mills, in which a hammer strikes the pieces of cocoanut, and when at the temperature indicated, the said very cold cocoanut is extremely friable so that it breaks up into particles preferably of about 1 to 20 microns in size.

It was well known that most kinds of organic material, when subjected to temperatures of the range indicated, will become extremely brittle so that a blow from a hammer will shatter the material into extremely fine particles.

Due to the very cold condition of the material undergoing the hammering treatment, said material does not warm up to any considerable extent but comes out of the mill as an extremely fine powder which is still very cold and is thoroughly saturated and surrounded by very cold nitrogen. Preferably a packaging device is mounted at the outlet end of the mill and the finely comminuted cocoanut goes into the packages thoroughly saturated with nitrogen and still extremely cold, and the packages can then be sealed immediately.

During this processing, the cocoanut is not subjected to any oxidation or atmospheric contact whatever after it enters the feed tower of the mill. The exclusion of atmospheric air (which contains oxygen) and the crushing of this product by impact in the cold nitrogen atmosphere acts as a preservative.

The cocoanut is preferably packed in air-tight tin cans or in plastic drum liners, the drums are preferably of either fiber or steel.

In this very fine condition the cocoanut is in an extremely desirable condition for use in the manufacture of candies, bakery goods, soft drinks, in all kinds of cookies, ice cream, etc., where the particle size of the cocoanut is so small that it serves as a penetrating and pungent flavoring material, without being visually apparent, and without being noticeable in mastication of the finished product. Thus the cocoanut material in this form can be more readily and easily and completely dispersed in liquid vehicles or in batter, etc., than with the conventional form of cocoanut such as shredded cocoanut commonly used in cooking.

It is believed that this extremely finely comminuted cocoanut, which has not undergone oxidation during the milling operation, is a new material which has never heretofore been produced or marketed.

Cacao beans are commonly used in the manufacture of cocoa and chocolate. The nibs are of a bean-like structure, and they ordinarily contain (dry basis) about 50% of natural oil (the so-called cocoa butter) which as well known also contains a considerable amount of flavoring material.

The cacao beans can be first chopped up into pieces varying in size from the size of millet seed up to the size of peas. The cacao beans, e. g. in the form indicated, can then be treated in substantially the same manner as the cocoanut.

The chocolate can be used for making chocolate liquor, or for the preparation of candies, ice cream, carbonated beverages, etc. They will be preferably milled in a hammer mill, by the process above described for cocoanut, in the form of particles of about 1 to 20 microns in size. This material is far more readily dispersed in the other materials to be used therewith in making chocolate products, than the ordinary chocolate of the prior art, on account of its fineness. Due to the treatment with liquefied nitrogen and the milling in the atmosphere of nitrogen, oxidation and rancidity are precluded.

Preferably the hammering operation is conducted when the chocolate material has been cooled to a temperature of about $-150°$ to $-225°$ F. and the packaging may be conducted in the same manner as for the fine cocoanut material.

Ginger root comes on the market in the form of dried roots of many odd shapes, the size of the pieces varying a good deal from large pieces say 1½ inches long and ¼ inch thick, and down to pieces of a size similar to dried navy beans, usually in odd shapes.

The roots as originally received can be chopped up if desired into pieces of about pea size, or smaller, and then treated approximately like the cocoanut in the first example. However since the ginger root contains a large amount of very tough fibrous material, and in order to achieve optimum comminution, the mill temperature is preferably about 250° below zero. For getting the lower temperature as here indicated, more of the liquefied nitrogen will be used as compared with the cocoanut example given above.

"Vanilla beans" are preferably handled about the same as the cacao beans referred to above, and the preferred temperature of the milling operation is about $-250°$ F.

We are of course aware that it has heretofore been proposed to grind certain kinds of materials in the presence of solid carbon dioxide (Dry Ice). However using Dry Ice it is not readily possible to maintain continuous operation of the mill, as a temperature as low as $-250°$ F., whereas in using liquid nitrogen temperatures as low as −320° F. can be readily maintained. This gives far greater flexibility to the process as outlined herein, as compared with processes in which Dry Ice are used in conjunction with a grinding operation.

Dry spices such as clover, cinnamon, pepper, allspice, nutmeg, etc., have heretofore been usually ground in an abrasion mill or cutting mill, in which much heat is generated and in which air is usually present, which operation is prone to cause oxidation and loss by evaporation of a substantial part at least of the flavoring principles present therein. We can treat these dry spices, substantially the same as comminuted cocoanut above, and for treating dry spices we preferably use temperatures of about −100° to −250° F., and a hammer mill, thereby reducing the dry spices to a particle size well below 30 microns and preferably about 1 and 20 microns in size.

The liquefied nitrogen in the process may contain more or less of the argon and other inert constituents of the air from which it was produced. These are inert, and do no harm in our process. But this liquefied nitrogen is free from any substantial and influential amounts of free oxygen, which, if present in any large amounts might be detrimental. The argon and other inert constituents (except the nitrogen) may be absent, being separately recovered in the process of manufacture of the liquefied nitrogen.

We claim:

1. A process of comminuting and preserving an edible flavoring material selected from the group consisting of cocoanut meat, cocoa beans and vanilla beans and parts thereof, ginger root and spices, which comprises contacting such material with liquefied nitrogen until the temperature of such material is reduced to not substantially above −100° F., and then, while in such refrigerated condition and in contact with concentrated nitrogen, subjecting same to the action of a hammer-mill until the bulk thereof is reduced to a particle size of substantially below 30 microns, and then packaging such material while still impregnated with nitrogen of a high concentration.

2. A process of producing a cocoanut meat product from cocoanut meat which comprises subjecting cocoanut meat, in a somewhat comminuted condition, to contact with liquefied nitrogen until the free oxygen content of same has been substantially eliminated and until the temperature of same has been reduced to at least as low as −100° F., and then, while in the presence of a high concentration of nitrogen, subjecting the same to a hammering operation, until the particle size of the bulk of said material has been reduced to well below 30 microns, and packing said powder cocoanut meat in an atmosphere of high nitrogen content.

3. A process as set forth in claim 2, in which the temperature of the cocoanut meat in the hammering operation is between −175° F. and about −225° F., and in which at least most of the cocoanut meat is beaten down to particles below 20 microns in size.

4. A process of producing finely divided chocolate material, which comprises subjecting cacao to contact with liquefied nitrogen until the major part at least of all free oxygen present has been eliminated, and until said chocolate material is at a temperature of about −100° to −225° F., then subjecting said chocolate material to a hammering operation while in an atmosphere consisting essentially of nitrogen and until the major part at least of such chocolate material has been reduced to a particle size below 30 microns in size, and then packaged same in an atmosphere consisting substantially of nitrogen.

5. A process of producing finely divided ginger root, which comprises subjecting ginger root to contact with liquified nitrogen until the major part at least of all free oxygen present has been eliminated, and until said ginger root is at a temperature of about −200° to −250° F., then subjecting said ginger root to a hammering operation while in an atmosphere consisting essentially of nitrogen and until the major part at least of such ginger root has been reduced to a particle size below 30 microns in size, and then packaging same while in an atmosphere consisting substantially of nitrogen.

6. A process of producing finely divided vanilla bean material, which comprises subjecting vanilla bean material to contact with liquefied nitrotrogen until the major part at least of all free oxygen present has been eliminated, and until said vanilla bean material is at a temperature of about −150° to −200° F., then subjecting said vanilla bean material to a hammering operation while in an atmosphere consisting essentially of nitrogen and until the major part at least of such vanilla bean material has been reduced to a particle size below 30 microns in size, and then packaging same while in an atmosphere consisting substantially of nitrogen.

7. A process of producing finely divided dry spice material, which comprises subjecting dry spice material to contact with liquefied nitrogen until the major part at least of all free oxygen present has been eliminated, and until said dry spice material is at a temperature of about −125° to −250° F., then subjecting said dry spice material to a hammering operation while in an atmosphere consisting essentially of nitrogen and until the major part at least of such dry spice material has been reduced to a particle size below 30 microns in size, and then packaging same while in an atmosphere consisting substantially of nitrogen.

JOHN L. HENDRY, Jr.
RICHARD R. PEDERSON.

REFERENCES CITED

The following references are of record in the file of this patent:

UNITED STATES PATENTS

| Number | Name | Date |
| --- | --- | --- |
| 1,129,868 | Hoy | Mar. 2, 1915 |

OTHER REFERENCES

"The Curing of Vanilla" by Balls and Arana, Industrial and Engineering Chemistry, vol. 33, No. 8, August 1941, pages 1073–1075.